US012592432B2

(12) United States Patent
Diny et al.

(10) Patent No.: US 12,592,432 B2
(45) Date of Patent: Mar. 31, 2026

(54) BATTERY UNIT COMPRISING COOLING MEANS

(71) Applicant: STELLANTIS AUTO SAS, Poissy (FR)

(72) Inventors: Mouad Diny, Asnieres sur Seine (FR); Thibault Van't Veer, Jaunay Clan (FR)

(73) Assignee: Stellantis Auto SAS, Poissy (FR)

( * ) Notice: Subject to any disclaimer, the term of this patent is extended or adjusted under 35 U.S.C. 154(b) by 147 days.

(21) Appl. No.: 18/559,256

(22) PCT Filed: Mar. 30, 2022

(86) PCT No.: PCT/FR2022/050589
§ 371 (c)(1),
(2) Date: Nov. 6, 2023

(87) PCT Pub. No.: WO2022/238631
PCT Pub. Date: Nov. 17, 2022

(65) Prior Publication Data
US 2024/0243388 A1 Jul. 18, 2024

(30) Foreign Application Priority Data
May 10, 2021 (FR) ..................................... 2104926

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/625* (2015.04);
(Continued)

(58) Field of Classification Search
CPC ......... H01M 10/6568; H01M 10/6557; H01M 10/658; H01M 10/6569; H01M 10/613; H01M 10/625
See application file for complete search history.

(56) References Cited

U.S. PATENT DOCUMENTS 10,665,915 B2   5/2020   Kim et al.
2005/0255379 A1*   11/2005   Marchio ............. H01M 50/131
429/153
(Continued)

FOREIGN PATENT DOCUMENTS

CN   112448065 A   *   3/2021   ............. B05B 14/00
DE   102017212208 A1   *   1/2019
(Continued)

OTHER PUBLICATIONS

Translation of FR3099643A1 named Translation-FR3099643A1 (Year: 2021).*

(Continued)

*Primary Examiner* — Paul Alvare
(74) *Attorney, Agent, or Firm* — Sandberg Phoenix & von Gontard, PC

(57) ABSTRACT
A battery unit includes a plurality of rows of cells, longitudinal members positioned between the rows of cells, a receptacle receiving the plurality of rows of cells and the longitudinal members, and a cooling system for cooling the cells. The cooling system includes:
  a dielectric-fluid circulation circuit positioned in the bottom of the receptacle and in the thickness of the longitudinal members,
  spray elements for spraying the dielectric fluid onto the rows of cells, the spray elements passing through an upper surface of the longitudinal members and communicating with the circulation circuit, and (Continued)

an extraction device for extracting the sprayed dielectric fluid passing through the upper surface and opening into the circulation circuit, and a dielectric-fluid cooling circuit connected to the circulation circuit.

10 Claims, 2 Drawing Sheets

(51) Int. Cl.
| | | |
|---|---|---|
| *H01M 10/625* | (2014.01) | |
| *H01M 50/204* | (2021.01) | |
| *H01M 50/249* | (2021.01) | |

(52) U.S. Cl.
CPC ....... *H01M 50/204* (2021.01); *H01M 50/249* (2021.01); *H01M 2220/20* (2013.01)

(56) References Cited

U.S. PATENT DOCUMENTS

| | | | | |
|---|---|---|---|---|
| 2015/0138723 A1* | 5/2015 | Shedd | ...................... | F25B 41/00 |
| | | | | 165/104.29 |
| 2017/0125860 A1* | 5/2017 | Chatroux | ............ | H01M 50/213 |
| 2018/0145382 A1* | 5/2018 | Harris | ................. | H01M 10/643 |
| 2018/0361858 A1* | 12/2018 | Hirsch | ................ | H01M 10/625 |
| 2021/0066767 A1 | 3/2021 | Gao | | |
| 2022/0069375 A1* | 3/2022 | Azzouz | ............... | H01M 10/613 |
| 2022/0093993 A1* | 3/2022 | Azzouz | ..................... | F28F 3/12 |

FOREIGN PATENT DOCUMENTS

| | | | | | |
|---|---|---|---|---|---|
| EP | 1191301 A2 * | 3/2002 | | ............. | F28F 25/02 |
| FR | 3099643 A1 * | 2/2021 | | ......... | H01M 10/613 |
| WO | 2017003510 A1 | 1/2017 | | | |
| WO | 2019115972 A1 | 6/2019 | | | |
| WO | WO-2020099738 A1 * | 5/2020 | | .......... | F28D 9/0037 |

OTHER PUBLICATIONS

Translation of DE102017212208A1 named Translation-DE102017212208A1 (Year: 2019).*

Translation of WO2020099738A1 named Translation-WO2020099738A1 (Year: 2020).*

Translation of CN112448065A named Translation-CN112448065A (Year: 2021).*

International Search Report corresponding to PCT/FR2022/050589 mailed on Jul. 19, 2022.

Written Opinion corresponding to PCT/FR2022/050589 mailed on Jul. 19, 2022.

* cited by examiner

BATTERY UNIT COMPRISING COOLING MEANS

CROSS-REFERENCE TO RELATED APPLICATIONS

This application is the US National Stage under 35 USC § 371 of International Application No. PCT/FR2022/050589, filed Mar. 30, 2022, which claims the priority of French application No. 2104926 filed on May 10, 2021, the content (text, drawings and claims) of both said applications being incorporated by reference herein.

BACKGROUND

The described methods and devices generally related to the cooling of storage batteries for vehicles. More particularly, a battery unit for a vehicle provided with cooling means is described.

A battery unit, also called a battery, is an assembly of electrochemical cells, also referred to as electrical accumulation cells or cells, each of which is an elementary unit for converting chemical energy into electrical energy, and vice versa. The cells are connected in series and/or in parallel and must be in sufficient number to reach the desired characteristics for the battery unit, in particular in terms of voltage, current and energy storage capacity. The temperature of the cells must be maintained in an optimal temperature range, without ever exceeding the upper limits defined by the manufacturers, in order to guarantee its performance and its durability.

In an electric or hybrid vehicle, the battery unit used for the traction of the vehicle, for example a battery unit of the lithium-ion type, is consequently heated during the charging and discharging phases thereof. Moreover, the need to reduce the charging time of the battery unit, in particular in electric vehicles of high energy capacity, leads to the development of high-power charging (HPC), also called Ultra-Fast Charging (UFC). The HPC charging requires increased thermal constraints on the battery unit. Typically, during HPC charging, the temperature of a lithium-ion type battery must not exceed 50° C. in order to guarantee operating safety and avoid premature aging thereof.

Air cooling systems can be used to ensure thermal conditioning of the battery unit. A circuit for cooling the battery unit formed through the structure of the battery unit, associated with outputs positioned opposite the battery modules so as to inject air onto the faces of the battery modules, is known for example from document US-B2-10665915.

Such an air cooling system does not allow effective cooling of the cells of a battery unit, in particular during a high-power charging (HPC) phase.

SUMMARY

The purpose is to overcome the disadvantages of the prior art by proposing a battery unit comprising cooling means allowing effective cooling of the cells of the battery unit, in particular during high-power charging phases.

In this context, described herein in its broadest sense is a battery unit comprising a plurality of rows of cells, longitudinal members positioned between the rows of cells, a receptacle receiving the plurality of rows of cells and the longitudinal members, and cooling means for cooling the cells. The cooling means for cooling the cells comprise:

a dielectric-fluid circulation circuit positioned in the bottom of the receptacle and in the thickness of the longitudinal members, spray means for spraying the dielectric fluid onto the rows of cells, the spray means passing through an upper surface of the longitudinal members and communicating with the circulation circuit, extraction means for extracting the sprayed dielectric fluid passing through the upper surface and opening into the circulation circuit, and a dielectric-fluid cooling circuit connected to the dielectric-fluid circulation circuit.

A dielectric fluid cooled by the cooling circuit is sprayed directly onto rows of cells. Thus, the cells of the battery unit are efficiently and uniformly cooled, including during a high-power charging (HPC) phase.

Additionally, the circulation circuit, the spray means and the dielectric-fluid extraction means are positioned in the structure of the battery unit, namely the bottom of the receptacle and the longitudinal members. This particular arrangement reduces the bulk of the battery unit.

In addition to the features that have just been mentioned in the preceding paragraph, the battery unit may have one or more complementary features among the following, considered individually or according to all technically possible combinations.

On a longitudinal member, the spray means are aligned on a row.

On a longitudinal member, the spray means are arranged alternately on two rows.

On a longitudinal member, each spray means is arranged to spray the dielectric fluid onto one of the two rows of cells juxtaposed to the longitudinal member.

On a longitudinal member, each spray means is arranged to spray the dielectric fluid onto the two rows of cells juxtaposed to the longitudinal member.

The spray means are formed by:

orifices provided in the longitudinal members, calibrated valves positioned in the longitudinal members, or orientable nozzles.

The extraction means are formed by unidirectional valves.

The cooling circuit comprises a device for cooling the dielectric fluid and means for pressurizing the dielectric fluid, said pressurizing means comprising:

low-pressure pressurizing means arranged to pressurize the dielectric fluid at low pressure; and high-pressure pressurizing means arranged to pressurize the dielectric fluid at high pressure.

The high-pressure pressurizing means are positioned in the dielectric-fluid circulation circuit.

Also disclosed is a method for cooling a battery unit according to any one of the aforementioned aspects, the battery unit being arranged in a vehicle provided with means for measuring the temperature of the battery unit and a cooling management computer, the method comprising, when the temperature of the battery unit exceeds a threshold value, a step of triggering, via the cooling management computer, a high-pressure circulation of the dielectric fluid in the dielectric-fluid circulation circuit so as to spray the dielectric fluid onto the rows of cells.

The described methods and devices and their various applications will be better understood upon reading the following description and examining the accompanying figures.

DETAILED DESCRIPTION

Figure 1:
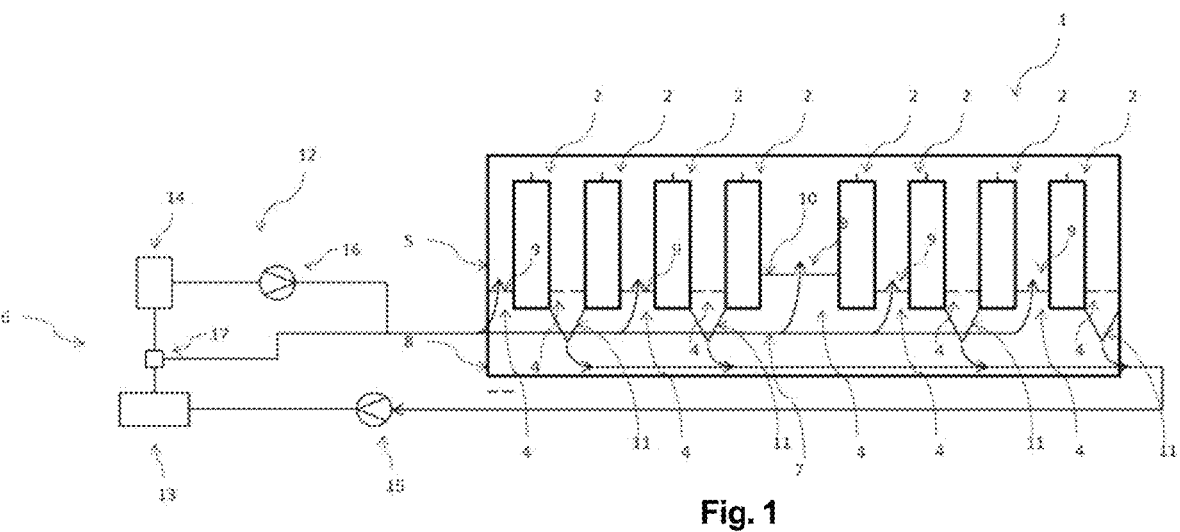
FIG. 1 schematically shows a battery unit according to a non-limiting aspect.
Figure 2:
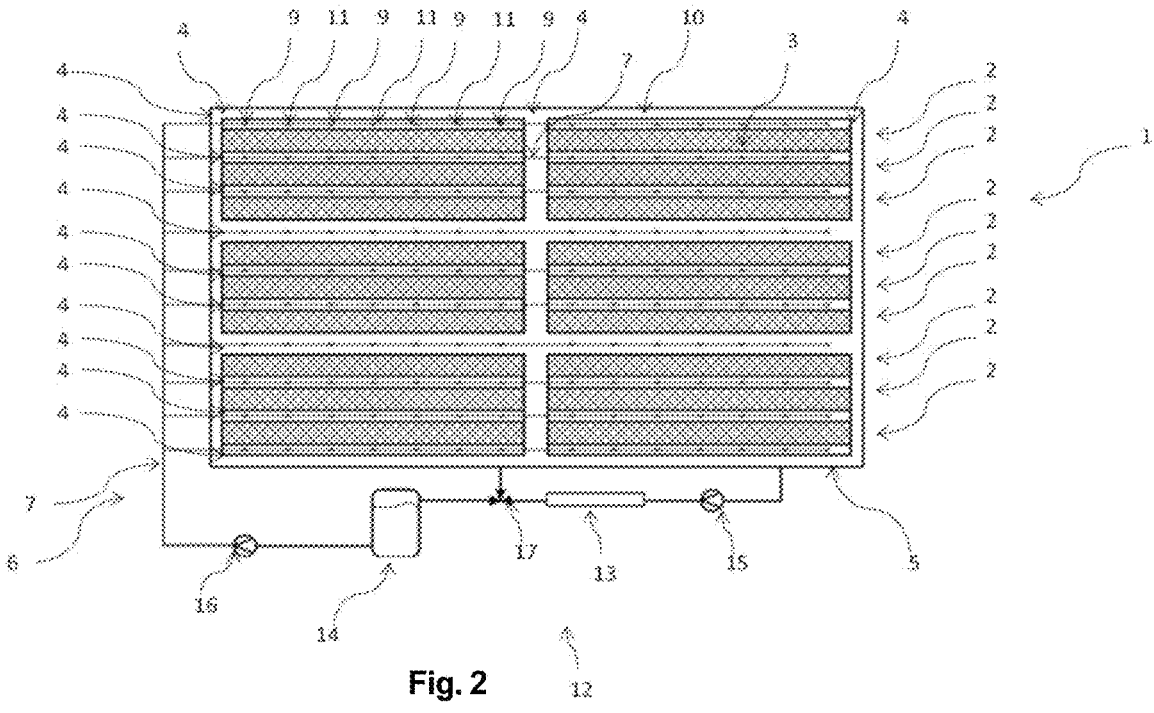
FIG. 2 schematically shows a top view of the battery unit shown in FIG. 1.

FIG. 1 schematically shows a battery unit 1 according to a non-limiting aspect. FIG. 2 shows a top view of the battery unit 1 shown in FIG. 1.

For the rest of the description, reference will be made indiscriminately to FIGS. 1 and 2.

The battery unit 1 is intended for use in an electric or hybrid vehicle.

The battery unit 1 comprises a plurality of rows 2 of cells 3. These cells 3 are electrical accumulation cells.

The battery unit 1 also comprises longitudinal members 4 arranged between the rows 2 of cells 3. These longitudinal members 4 in particular hold the rows 2 of cells 3.

The battery unit 1 further comprises a receptacle 5 which in particular receives the rows 2 of cells 3 and the longitudinal members 4.

The battery unit 1 further comprises means 6 for cooling the cells 3.

The cooling means 6 comprises a dielectric-fluid circulation circuit 7. This dielectric-fluid circulation circuit 7 is positioned in the bottom 8 of the receptacle 5 and in the thickness of the longitudinal members 4. In other words, in order to be able to receive the dielectric fluid, the longitudinal members 4 are hollow.

It should be noted that the lower end of the cells 3 is positioned in the dielectric-fluid circulation circuit 7.

The cooling means 6 further comprises spray means 9 for spraying the dielectric fluid onto the rows 2 of cells 3. The spray means 9 pass through an upper surface 10 of the longitudinal members 4 and communicate with the dielectric-fluid circulation circuit 7.

In this exemplary embodiment, the spray means 9 are formed by orifices provided in the upper surface 10 of the longitudinal members 4.

In another embodiment, not shown, the spray means 9 are formed by calibrated valves arranged to spray the dielectric fluid when the pressure in the circulation circuit 7 exceeds a predetermined value.

In another embodiment, not shown, the spray means 9 are formed by orientable nozzles. The nozzles of a longitudinal member 4 can for example be positioned on an electrically orientable ramp.

These cooling means 6 further comprise extraction means 11 for extracting the sprayed dielectric fluid. These extraction means 11 pass through the upper surface 10 of the longitudinal member 4 and open into the dielectric-fluid circulation circuit 7.

The extraction means 11 can for example be formed by unidirectional valves.

The cooling means 6 further comprise a cooling circuit 12 for cooling the dielectric fluid.

The cooling circuit 12 is connected to the dielectric-fluid circulation circuit 7.

In a non-limiting embodiment, the cooling circuit 12 comprises:

a dielectric-fluid cooling device 13, this cooling device 13 being able to be formed by a heat exchanger;

a reservoir 14 of dielectric liquid;

means 15, 16 for pressurizing the dielectric fluid, the pressurizing means 15, 16 comprise:

low-pressure pressurizing means 15 arranged to pressurize the dielectric fluid at low pressure, high-pressure pressurizing means 16 arranged to pressurize the dielectric fluid at high pressure, and bypass means 17 for short-circuiting the high-pressure pressurizing means 16.

In the example shown, the low-pressure pressurizing means 15 are formed by a low-pressure pump and the high-pressure pressurizing means 16 are formed by a high-pressure pump.

In an embodiment, not shown, the pressurizing means are formed by a two-stage pump, a first stage forming the low-pressure pressurizing means and the other stage forming the high-pressure pressurizing means.

Figure 3:
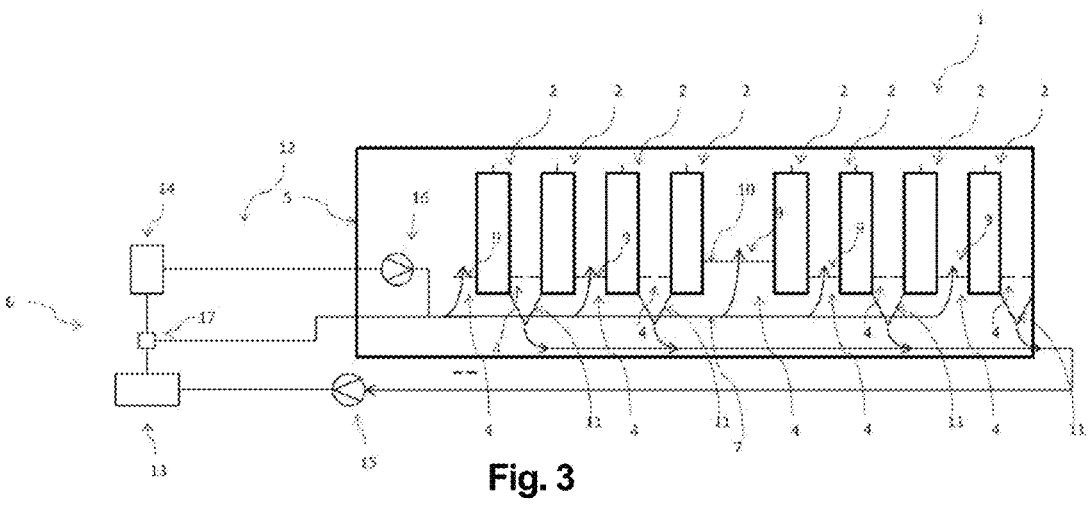
FIG. 3 schematically shows a battery unit according to another non-limiting aspect.

FIG. 3 shows another embodiment wherein the high-pressure pressurizing means 16 is positioned in the dielectric-fluid circulation circuit 7, in other words in the receptacle 5. Such an arrangement reduces the bulk of the battery unit 1.

Thus, during normal operating situations of the battery unit 1, the cells 3 which are held by the longitudinal members 4 are semi-immersed in the dielectric-fluid circulation circuit 7. The low-pressure pump 15 is activated and the bypass means 17 short-circuit the high-pressure pump 16 so as to circulate the dielectric fluid without spraying. Thus, the lower parts of the cells 3, which are immersed in the dielectric fluid circulating in the circulation circuit 7, are cooled via direct contact with the dielectric fluid.

During high-stress life situations of the cells 3 with a rapid charging or discharging request, under extreme weather conditions, during highway travel or when there is thermal runaway, the spraying function is activated by means of the high-pressure pump 16, which will pressurize the dielectric fluid at high pressure to spray it via the spray means 9 of the longitudinal members 4 to spray the faces of the juxtaposed cells 3 and optionally the electrical bus bars for the electrical connection of the cells 3.

Thus, it is possible to rapidly cool the battery unit 1 via direct spraying of the dielectric fluid onto the faces of the cells 3 without impacting the height of the battery unit 1 and also to prevent the occurrence of the thermal runaway phenomenon in the battery 1.

Figure 4:
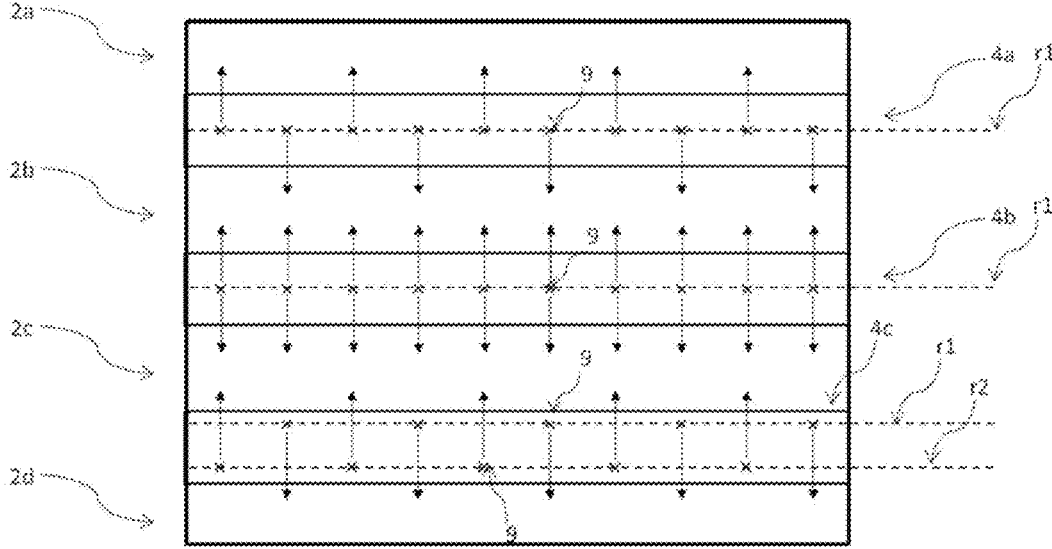
FIG. 4 shows three exemplary embodiments of spray means comprised in a battery unit according to a non-limiting aspect.

FIG. 4 shows a top view of three longitudinal members 4a, 4b, 4c positioned between four rows 2a, 2b, 2c, 2d of cells.

More particularly, the rows 2a and 2b of cells are juxtaposed to the longitudinal member 4a, the rows 2b and 2c of cells are juxtaposed to the longitudinal member 4b and the rows 2c and 2d of cells are juxtaposed to the longitudinal member 4c.

In this exemplary embodiment, the spray means 9 of the longitudinal member 4a are aligned on a row r1, the spray means 9 of the longitudinal member 4b are aligned on a row r1, and the spray means 9 of the longitudinal member 4c are aligned alternately on two rows r1 and r2.

On the longitudinal member 4a, each spray means 9 is arranged to spray the dielectric fluid onto one of the two rows 2a, 2b of cells juxtaposed to the longitudinal member 4a. More particularly, the spray means 9 are arranged to alternately spray the dielectric fluid onto one row 2a of cells and then onto the other row 2b of cells.

On the longitudinal member 4b, each spray means 9 is arranged to spray the dielectric fluid onto the two rows 2b, 2c of cells juxtaposed to the longitudinal member 4b.

On the longitudinal member 4c, each spray means 9 is arranged to spray the dielectric fluid onto one of the two rows 2c, 2d of cells juxtaposed to the longitudinal member 4c. More particularly, each of the spray means 9 is arranged to spray the dielectric fluid onto the furthest juxtaposed row of cells 2c, 2d.

Figure 5:
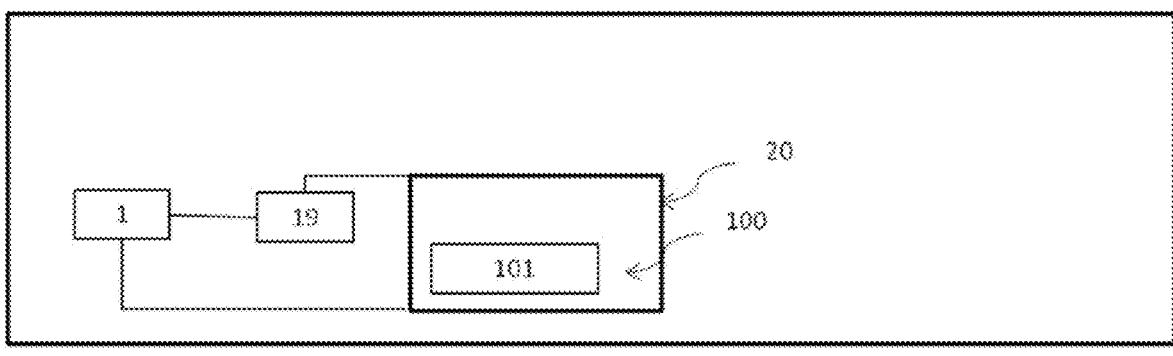
FIG. 5 schematically shows a method for cooling a battery unit according to a non-limiting aspect.

FIG. 5 shows a method 100 for cooling a battery unit according to one of the aforementioned aspects. The battery unit 1 is arranged in a vehicle 18 provided with means 19 for measuring temperature of the battery unit 1, such as a temperature sensor configured to provide a signal to a cooling management computer 20.

When the temperature of the battery unit 1 exceeds a threshold value, the method 100 comprises a step of triggering 101, via the cooling management computer 20, a high-pressure circulation of the dielectric fluid in the dielectric-fluid circulation circuit 7. Thus, the dielectric fluid is sprayed onto the rows 2 of cells 3. In other words, during this step 101, the high-pressure pump 16 is activated so as to increase the pressure in the circulation circuit 7 until the dielectric fluid is ejected via the spray means 9 onto the rows 2 of cells 3.

It is understood that a person skilled in the art is able to make modifications, in particular as regards the arrangement of the dielectric-fluid spray means and extraction means.

The invention claimed is:

1. A battery unit comprising a plurality of rows of cells, longitudinal members having upper surfaces below a top of said cells positioned between said rows of cells, said longitudinal members being hollow, a receptacle receiving said plurality of rows of cells and said longitudinal members, and cooling means for cooling said cells, wherein said cooling means for cooling said cells comprises:

a dielectric-fluid circulation circuit partially positioned at the bottom of the receptacle and at least partially bounded by the thickness of said longitudinal members, spray means for spraying said dielectric fluid onto said rows of cells, said spray means being positioned in the longitudinal members, said spray means passing through an upper surface of said longitudinal members and communicating with said circulation circuit, extraction means for extracting said sprayed dielectric fluid passing through said upper surface and opening into said circulation circuit, and a dielectric-fluid cooling circuit connected to said dielectric-fluid circulation circuit;

wherein the cells are partially immersed in the dielectric-fluid circulation circuit, and wherein the cooling circuit comprises a cooling device for cooling the dielectric fluid and pressurizing means for pressurizing said dielectric fluid, said pressurizing means comprising:

a low pressure pump adapted to pressurize the dielectric fluid at a pressure sufficiently low to avoid spraying of said dielectric fluid, and a high pressure pump adapted to pressurize the dielectric fluid at a pressure sufficiently high to cause said dielectric fluid to spray through said spray means;

wherein the high-pressure pump is distinct from said low-pressure pump; said pressurizing means further including a bypass operable to bypass said high-pressure pump during said first driving situation; and, wherein said battery unit is positioned in a vehicle, and wherein, when the vehicle is in a first driving situation which does not require rapid cooling, said high-pressure pump is not active, such that spraying of said dielectric fluid is avoided and when the vehicle is in a second driving situation which requires additional cooling, said high-pressure pump is activated to provide additional cooling to said battery unit.

2. The battery unit according to claim 1, wherein the spray means of a longitudinal member are aligned in a row.

3. The battery unit according to claim 1, wherein the spray means of a longitudinal member are positioned in two rows on said longitudinal member in an alternating pattern.

4. The battery unit according to claim 1, wherein each spray means of a longitudinal member is arranged to spray the dielectric fluid onto one of the two rows of cells juxtaposed to the longitudinal member.

5. The battery unit according to claim 1, wherein each spray means of a longitudinal member is arranged to spray the dielectric fluid onto the two rows of cells juxtaposed to said longitudinal member.

6. The battery unit according to claim 1, wherein the spray means are formed by:

orifices provided in the longitudinal members, calibrated valves positioned in the longitudinal members, or orientable nozzles.

7. The battery unit according to claim 1, wherein the extraction means are formed by unidirectional valves.

8. The battery unit according to claim 1, wherein the high-pressure pump is positioned in the circulation circuit.

9. A method for cooling a battery unit according to claim 1, said vehicle being provided with means for measuring the temperature of the battery unit and a cooling management computer, said method comprising, when the temperature of the battery unit exceeds a threshold value, a step of triggering, via the cooling management computer, a high-pressure circulation of the dielectric fluid in the dielectric-fluid circulation circuit so as to spray said dielectric fluid onto said rows of cells.

10. The battery unit according to claim 1 wherein the spray means are configured to spray dielectric fluid onto faces of said cells of said battery unit.

* * * * *